United States Patent [19]

Takizawa

[11] Patent Number: 5,443,587

[45] Date of Patent: Aug. 22, 1995

[54] INJECTION MOLDING MACHINE CONTROL HAVING MOTOR SLIP COMPENSATOR

[75] Inventor: Michiaki Takizawa, Nagano

[73] Assignee: Nissei Plastic Industrial Co., Ltd., Nagano, Japan

[21] Appl. No.: 73,599

[22] Filed: Jun. 9, 1993

[30] Foreign Application Priority Data

Jun. 9, 1992 [JP] Japan .................................. 4-174873

[51] Int. Cl.⁶ ........................ F04B 1/26; B29C 47/92
[52] U.S. Cl. ........................... 417/222.1; 60/449; 425/145
[58] Field of Search ............... 417/222.1, 271; 60/449; 425/145

[56] References Cited

U.S. PATENT DOCUMENTS

| | | | |
|---|---|---|---|
| 3,785,754 | 1/1974 | Miller | 417/222.1 |
| 4,103,489 | 8/1978 | Fletcher et al. | 60/449 |
| 5,088,297 | 2/1992 | Maruyama et al. | 417/45 |

FOREIGN PATENT DOCUMENTS

| | | |
|---|---|---|
| 62-228701 | 10/1987 | Japan . |
| 62-270803 | 11/1987 | Japan . |
| WO88/1349 | 2/1988 | WIPO ............... 417/222.1 |

*Primary Examiner*—Richard A. Bertsch
*Assistant Examiner*—Roland G. McAndrews, Jr.
*Attorney, Agent, or Firm*—Birch, Stewart, Kolasch & Birch

[57] ABSTRACT

An apparatus for controlling an injection molding machine includes a slipping detection device to detect the slippage of a pump motor which drives a hydraulic pump; a rotational velocity sensor which detects the rotational velocity of the pump motor, for example; and an instruction signal correcting circuit having an addition circuit which adds the operation circuit which obtains from the detected signal of the rotational sensor a flow rate instruction correcting signal to compensate the reduction of the discharge flow rate due to the increased slippage, and the flow rate instruction correcting signal to the flow rate signal, and then, detects the slippage of the pump motor and corrects the magnitude of the flow rate instruction signal thereby to compensate the discharge flow rate.

2 Claims, 3 Drawing Sheets

INJECTION MOLDING MACHINE CONTROL HAVING MOTOR SLIP COMPENSATOR

1. FIELD OF THE INVENTION

The present invention relates to an apparatus for controlling an injection molding machine using an electromagnetic proportional type variable discharge piston pump which enables its discharge flow rate to be varied in accordance with the amplitude of an flow rate instruction signal to be inputted.

2. DESCRIPTION OF THE RELEVANT ART

There has hitherto been known a hydraulic circuit to control the driving of a hydraulic actuator by the use of an electromagnetic proportional type variable discharge piston pump such as disclosed in Japanese Patent Application Laid-Open No. SHO-62-228701 (1987) and Japanese Patent Application Laid-Open No. SHO-62-270803 (1987).

FIG. 3 is a view showing a hydraulic circuit disclosed in the Japanese Patent Application Laid-Open No. SHO-62-270803. The hydraulic circuit Co shown in FIG. 3 is arranged to allow the slant plate angle to be varied directly in accordance with the amplitude of an instruction signal to be inputted, and is also provided with an electromagnetic proportional type variable discharge piston pump 50 whose discharge flow rate and discharge pressure are varied in accordance with the slant plate angles. This piston pump 50 is connected to a hydraulic actuator 52 through a four-way directional switching valve 51. Also, to the piston pump 50, a controller 53 is connected. At the same time, a pump motor 55 is connected to the pump shaft of the pump main body 54 provided for the piston pump 50. In this respect, a reference numeral 56 designates an oil tank.

On one hand, the piston pump 50 operates as given below. At first, when the discharge flow rate is being controlled, a flow rate instruction signal corresponding to the set value set by a flow rate setter 57 is transmitted from the controller 53 to the piston pump 50. The piston pump 50 compares this set value and a detected value of the slant plate angle by a slant plate angle sensor 58, and based on the deflection thus obtained, the pump controls a control valve 59 by switching it. In this way, the control valve 59 causes the pressure oil to be supplied or exhausted for one operational piston 60 which balances the slant plate so that the set value and detected value are in agreement. In this respect, the slant plate is balanced by the operational piston 60 on one side and a spring 61 on the other, and a bias piston 62. The slant plate angle can be varied by varying this balance. This spring 61 is biased to enable the slant plate to maximize its slant rotation in order to secure the rising characteristics.

On the other hand, when the discharge pressure is being controlled, a pressure instruction signal corresponding to the set value set by a pressure setter 63 is transmitted from the controller 53 to the piston pump 50. The piston pump 50 compares this set value and the detected value of the discharge pressure by the pressure sensor 64 to control the control valve 59 by switching it on the basis of the deflection thus obtained. In this way, the control valve 59 performs the supply or exhaust of the pressure oil to or from the operational piston 60 so that the set value and the detected value are controlled to be in agreement.

However, when the above-mentioned conventional hydraulic circuit Co is used for an injection molding machine, there is encountered a problem which creates the drawbacks given below.

In other words, when the set value of a discharge flow rate (velocity set value) Fs and the set value of a pressure Ps are specifically set as shown in FIG. 2 in an injection process, the resin in the heated cylinder is filled in the cavity of a metallic die due to the forward movement of a screw at the injection. Therefore, in accordance with the forward positions of the screw, the load pressure Pr to the screw is increased and at the same time, the load to the pump motor 55 which drives the piston pump 50 is also increased. Usually, an induction motor being employed for the pump motor 55, slipping is also increased by the increase of the load. Consequently, the rotational velocity Vm of the pump motor 55 is fluctuated (reduced), and the discharge flow rate of the piston pump 50 is fluctuated (reduced).

Meanwhile, when the piston pump 50 operates, the slant plate angle is detected by the slant plate sensor 58. With this detected value, the discharge flow rate is fed back for controlling. In other words, the fluctuation (reduction) of the discharge flow rate due to the pump motor 55 does not produce any effect on the slant plate angle.

As a result, in spite of the fact that the feedback system for the discharge flow rate in the piston pump 50 is normally functioning, the actual discharge flow rate fluctuates corresponding to the amplitude of the load applied to the pump motor 55 after all. Thus, a problem is encountered that it is impossible for the hydraulic actuator 52 to control speeds with stability and a high precision when a hydraulic circuit Co of the kind is employed for an injection molding machine.

SUMMARY OF THE INVENTION

The present invention makes it possible to control speeds with stability and a high precision by the use of a hydraulic actuator. At the same time, it is an object of the invention to provide an apparatus for controlling an injection molding machine capable of implementing the quality improvement of molded products as well as the reduction of defective products.

In order to achieve this object, an apparatus for controlling an injection molding machine according to the present invention is provided with slipping detection means 4 to detect the slip of a pump motor 3, that is, a rotational velocity sensor $4s$ to detect the rotational velocity of the pump motor 3, for example, which drives a hydraulic pump 2 such as an electromagnetic proportional type variable discharge piston pump wherein its slant plate angle varies in accordance with the amplitude of a discharge flow rate instruction signal Sf, and its discharge flow rate Fo varies in accordance with the slant plate angle; and instruction signal correcting means 5 having an addition circuit 7 which adds to a flow rate instruction signal Sf an operation circuit 6 arranged to obtain a flow rate instruction correcting signal Sa from the detecting signal Sd of the rotational velocity sensor $4s$, which compensates the reduction of the discharge flow rate Fo due to the increased slippage, and the flow rate instruction correcting signal Sa as well.

Thus, the slant plate angle of the hydraulic pump 2 is caused to vary directly in accordance with the amplitude of the flow rate instruction signal Sf to be inputted into the hydraulic pump thereby to vary the discharge flow rate Fo. On the other hand, when an injection is performed in an injecting process, the load applied to the pump motor 3 is increased corresponding to the forward position of the screw. Therefore, while slippage of the pump motor 3 is also increased, this slippage is detected by the rotational velocity sensor 4s as the rotational velocity of the pump motor 3, and the signal Sd thus detected is provided for the operation circuit 6. In the operation circuit 6, a flow rate instruction correcting signal Sa which compensates the reduction of the discharge flow rate Fo due to the increased slippage is created on the basis of a data table prepared in advance, for example. Hence, this flow rate instruction correcting signal Sa is provided for the addition circuit 7. Then, in the addition circuit 7, the flow rate instruction correcting signal Sa is added to the flow rate instruction signal Sf. Consequently, the reduction of the discharge flow rate Fo due to the fluctuation (increase) of the slippage in the pump motor 3 is compensated, thus making it possible to perform the speed control and others for the hydraulic actuator with stability and a high precision at all times.

DETAILED DESCRIPTION OF THE PREFERRED EMBODIMENTS

Hereinafter, the description will be made of the embodiments according to the present invention in accordance with the accompanying drawings.

Figure 1:
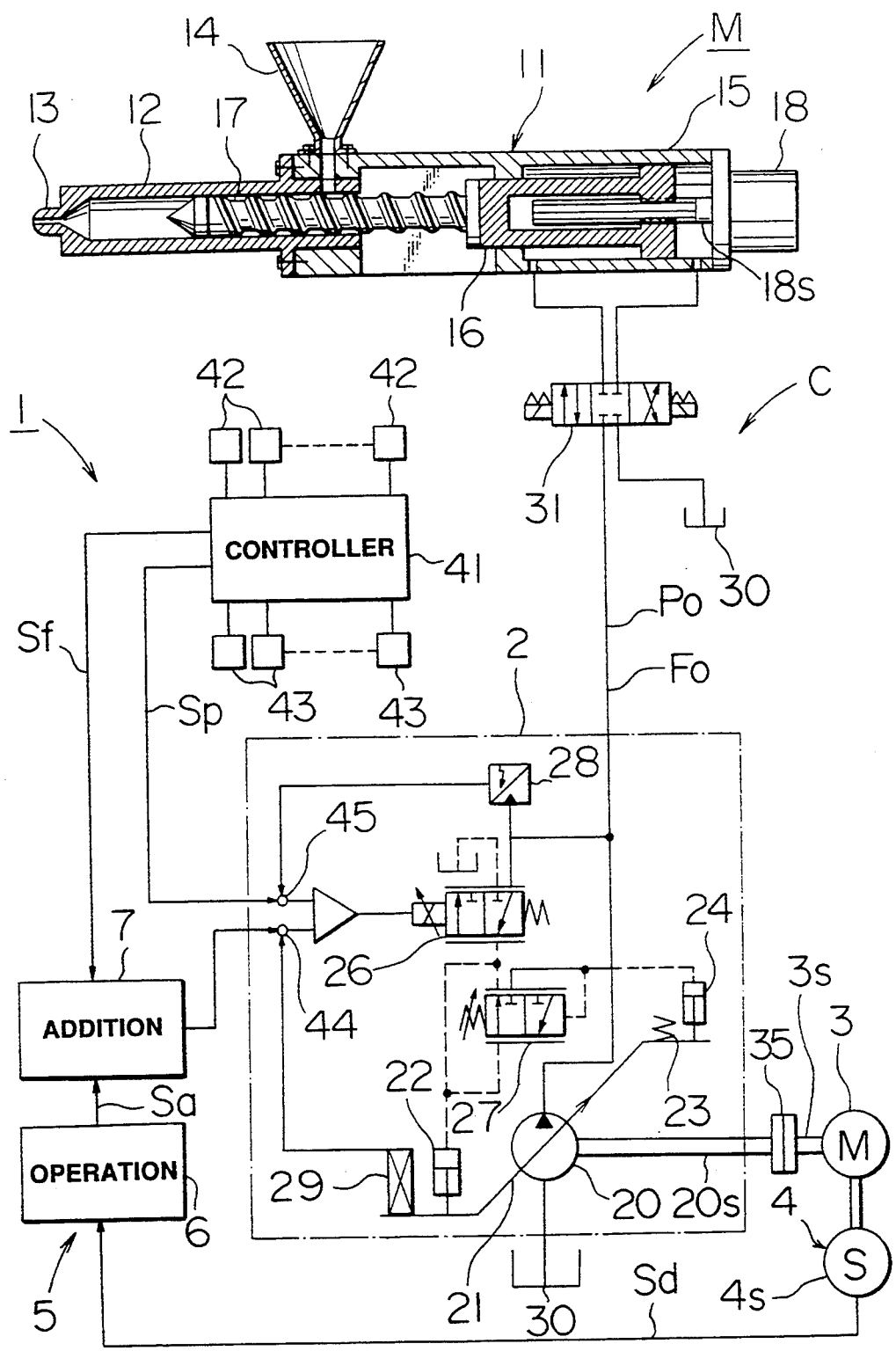
FIG. 1: A diagram showing a hydraulic circuit of an injection molding machine including a controlling apparatus according to the present invention.
Figure 2:
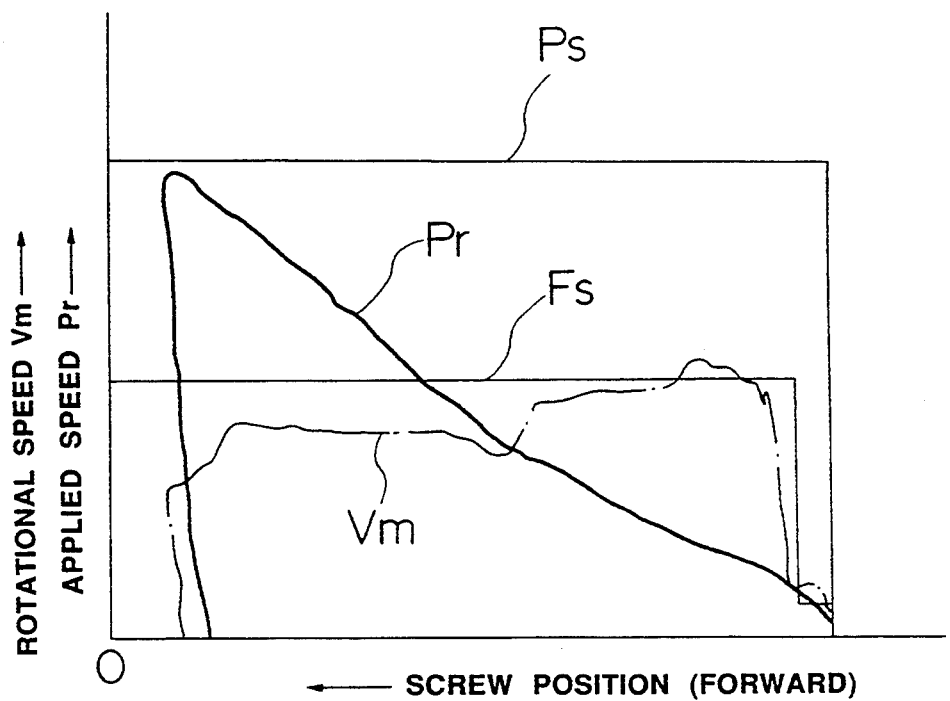
FIG. 2: A diagram showing the various characteristics in the screw position of the injection molding machine.
Figure 3:
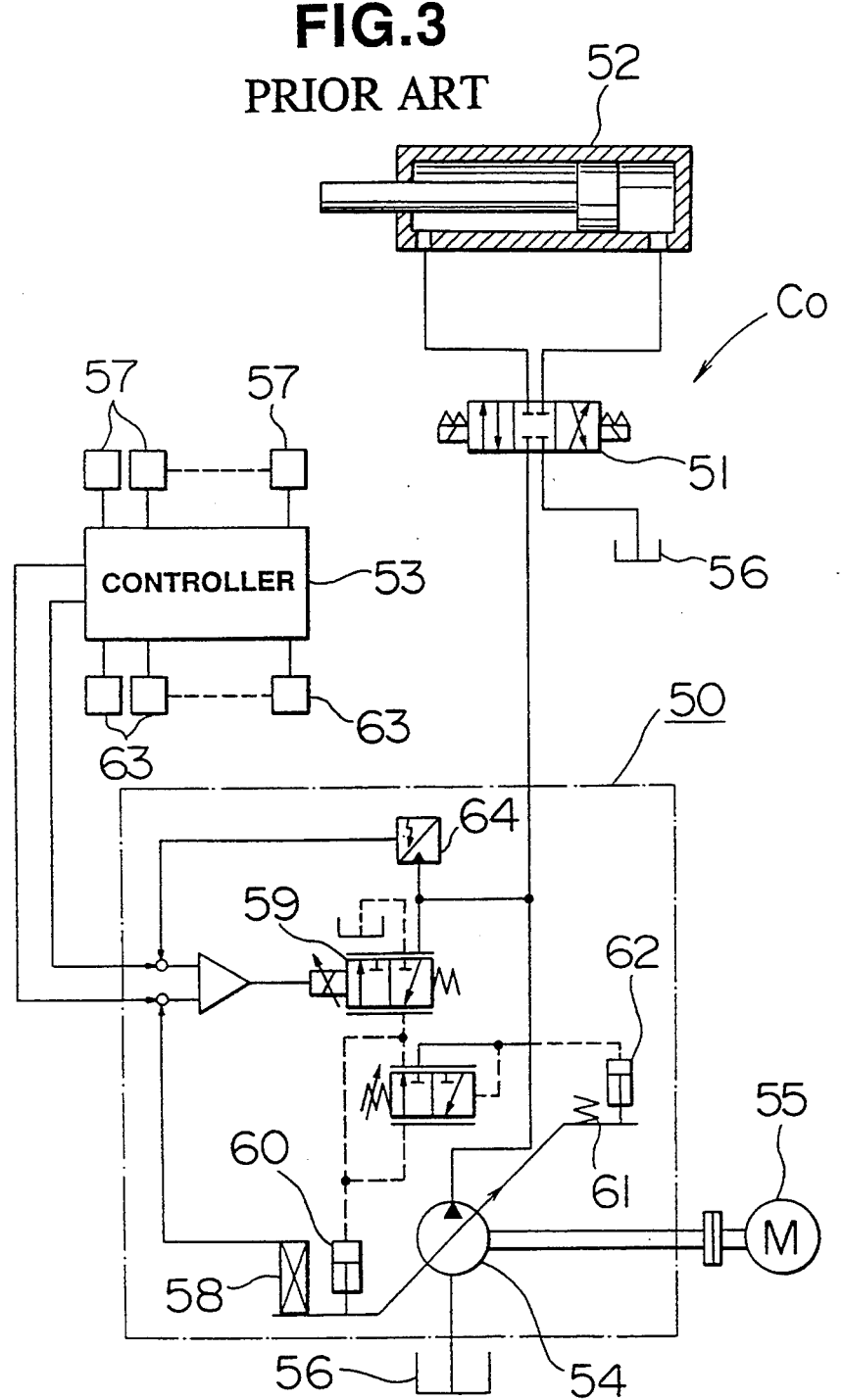
FIG. 3: A circuit diagram showing a hydraulic circuit of an injection molding machine including a controlling apparatus according to the prior art.

At first, in order to facilitate understanding of the present invention, the schematic structure of an injection molding machine M will be described with reference to FIG. 1.

A reference numeral 11 designates an injector in an injection molding machine M. The injector 11 is provided with a heated cylinder 12 at its front, and an injection nozzle 13 is arranged at the front end of the heated cylinder 12 and at the same time, a hopper 14 is provided at its rear end. Also, the rear end of the heated cylinder 12 is coupled to the front end of the injection cylinder 15. The rear end of a screw 17 is coupled to the front end of an injection ram 16 provided in the injection cylinder 15 simultaneously. Then, the front side of the screw 17 penetrates in the heated cylinder 12. In this respect, a reference numeral 18 designates an oil motor having a rotational shaft 18s which is connected with the injection ram 16 by means of a spline.

Also, a reference mark C designates a hydraulic circuit provided with a hydraulic pump 2. In this case, as the hydraulic pump 2, it is preferable to use an electromagnetic proportional type variable discharge piston pump. The electromagnetic proportional type variable discharge piston pump is able to cause the slant plate angle to vary directly and dynamically in accordance with the magnitude of the flow rate instruction signal Sf and the pressure instruction signal Sp to be inputted, and thus, to vary the discharge flow rate Fo and the discharge pressure Po in accordance with the slant plate angle. In other words, the hydraulic pump (electromagnetic proportional type variable discharge piston pump) 2 has a pump main body 20 incorporated therein. The pump main body 20 is provided with a slant plate 21 capable of varying the discharge flow rate Fo and the discharge pressure Po. The slant plate 21 stops at a position where the pressures of an operational piston 22 on one hand and a spring 23 on the other, and a bias piston 24 are balanced. When a pressure oil is supplied to the operational piston 22, the slant plate 21 is displaced in the direction where the discharge from the pump main body 20 is reduced. Meanwhile, a control valve 26 is connected to a branch passage on the discharging side of the pump main body 20. This control valve 26 is connected to the operational piston 22 through safety valve 27. In this respect, a reference numeral 28 designates a pressure sensor to detect the discharge pressure of the pump main body 20, and 29, a slant plate angle sensor (potentiometer).

Furthermore, the sucking side of the pump main body 20 is connected to an oil tank 30. At the same time, the discharging side of the pump main body 20 and the oil tank 30 are connected to a front oil chamber and a rear oil chamber of the injection cylinder 15 through a four-way directional switching valve 31.

On the other hand, the rotational shaft 3s of the pump motor 3 is connected to the pump shaft 20s of the pump main body 20 through a transmission joint 35. Here, the pump motor 3 is an induction motor.

Subsequently, with reference to FIG. 1, the description will be made of the specific structure of a controlling apparatus 1 according to the present invention.

A reference numeral 41 designates a controller provided with flow rate setters 42 and pressure setters 43. The controller 41 has a function to give the flow rate instruction signal Sf and the pressure instruction signal Sp to the hydraulic pump 2. In this case, a flow rate instruction signal Sf corresponds to a set value defined by the flow rate setters 42 and a pressure instruction signal Sp corresponds to a set value defined by the pressure setters 43.

Meanwhile, the pump motor 3 is provided with a rotational velocity sensor (pulse generator) 4s to detect the slippage of this motor 3, that is, to detect the rotational velocity having a functional relation with the slippage. The rotational velocity sensor 4s is connected to an operation circuit 6. Also, a reference numeral 7 designates an addition circuit. To its input side on one hand, the controller 41 is connected to give a flow rate instruction signal Sf. To its input side on the other hand, the output side of the operation circuit 6 is connected. Then, the output side of the addition circuit 7 is connected to an input side of a comparator 44 which is incorporated in the hydraulic pump 2. In addition, a slant plate angle sensor 29 is connected to the input side of the comparator 44.

In contrast, to the input side of the comparator 45 which is incorporated in the hydraulic pump 2 to give a pressure instruction signal Sp, the controller 41 is connected on one hand. In this respect, a pressure sensor 28 is connected to the input side of the comparator 45 on the other hand.

Now, the operation of the controlling apparatus 1 will be described together with that of the hydraulic circuit C.

At first, when the discharge flow rate is controlled, a flow rate instruction signal Sf corresponding to a set value defined by the flow rate setters 42 and is given from the controller 41 to the hydraulic pump 2. In this respect, if no flow rate instruction signal Sf is provided, the control valve 26 is switched over to the right-hand side in FIG. 1. Thus, the pressure oil is supplied to the operational piston 22 through the control valve 26. In this way, the slant plate 21 is caused to stand against the biasing force of the spring 23 to make the discharge flow rate Fo zero for the hydraulic pump 2. On the other hand, if the flow rate instruction signal Sf is provided, this set value and the detected value of the slant plate angle detected by the slant plate angle sensor 29 are compared by the comparator 44. Then, the control valve 26 is switched over to the left-hand side in FIG. 1 by the deflection thus obtained. Therefore, by the biasing force of the spring 23, the slant plate 21 is displaced. The oil in the operational piston 22 is returned to the oil tank 30 at the same time thereby to enable the slant plate to be set at a given angle required for controlling. As a result, the injection cylinder 15 is driven by the set discharge flow rate Fo. The screw 17 advances at a target speed.

At this juncture, in the initial advancement of the screw 17, the load pressure to the screw 17 is comparatively small. The load applied to the pump motor 3 is also small. Accordingly, it is possible to maintain its slippage at a normal value, that is, approximately 3%. However, along with the advancement of the screw 17, the load pressure is being increased, hence increasing the load applied to the pump motor 3 and its slippage as well to result in lowering the rotational velocity of the pump motor 3. This reduction of the rotational velocity is detected by the rotational velocity sensor 4s. The detected signal Sd thus obtained is given to the operation circuit 6. Hence, the operation circuit 6 creates a flow rate instruction correcting signal Sa to compensate the reduction of the discharge flow rate Fo corresponding to the increased portion of the slippage on the basis of data table and others prepared in advance. The flow rate instruction correcting signal Sa is given to the addition circuit 7 to add this flow rate instruction correcting signal Sa to the original flow rate instruction signal Sf. Therefore, the reduction of the discharge flow rate Fo by the variation of the slippage in the pump motor 3 is compensated, hence making it possible to control the injection speed with stability and a high precision.

On the other hand, when the discharge pressure is controlled, the pressure instruction signal Sp corresponding to a set value defined by the pressure setters 43 is given from the controller 41 to the hydraulic pump 2. In the hydraulic pump 2, this set value and a detected value of the discharge pressure detected by the pressure sensor 28 are compared. The control valve 26 is then switched over for controlling on the basis of the deflection thus obtained. Accordingly, the control valve 26 supplies or exhausts the pressure oil for the operational piston 22 to control the set value and detected value to be in agreement.

In this respect, while a case where the flow rate instruction signal Sf obtained from the controller 41 is corrected by the flow rate instruction correcting signal Sa in the present embodiment, it may be possible to correct the detected signal obtained from the slant plate angle sensor 29 or to correct the output signal from the comparator 44 likewise. Therefore, in the present invention, a "flow rate instruction signal" when a flow rate instruction signal is corrected by detecting the slippage means a concept which includes various signals in the range from the controller 41 to the control valve 26.

As set forth above, the present embodiment is described in detail. However, it is to be understood that the present invention is not limited to such embodiment. For example, when the slippage is detected, the rotational velocity is detected in the present embodiment, but it may be possible to detect the power (current), torque, or the like in the pump motor instead. Also, a combination of an operation circuit and an addition circuit is exemplified as instruction signal correcting means in the present embodiment, but it may be possible to employ other circuit configurations and techniques. Moreover, an electromagnetic proportional type variable discharge piston pump is exemplified as the hydraulic pump in it, but it may be possible to adopt an hydraulic pump of some other type instead. Besides, the details of the structure, configurations, numerical values, and others may be modified arbitrarily without departing the purport and spirit of the present invention.

I claim:

1. An apparatus for controlling an injection molding machine provided with a hydraulic pump, a discharge flow rate of which varies in accordance with a magnitude of a flow rate instruction signal to be inputted, said apparatus comprising:
   slipping detection means for detecting a rotational velocity of a pump motor which drives the hydraulic pump by a rotational velocity sensor, and for detecting a slippage of the pump motor; and
   instruction signal correcting means, having a calculating circuit which obtains a flow rate instruction correcting signal, for compensating for a reduction of the discharge flow rate due to increased slippage on the basis of a detected signal obtained from said slipping detection means, and having adding means for adding the flow rate instruction correcting signal to the flow rate instruction signal.

2. An apparatus for controlling an injection molding machine according to claim 1, wherein
   the hydraulic pump is an electromagnet proportional type variable discharge piston pump a slant plate angle of which varies in accordance with the a magnitude of the flow rate instruction signal and the discharge flow rate of which varies in accordance with the slant plate angle.

* * * * *